United States Patent [19]
Hara et al.

[11] Patent Number: 4,950,894
[45] Date of Patent: Aug. 21, 1990

[54] RADIATION IMAGE READ-OUT METHOD

[75] Inventors: Makoto Hara; Yuuma Adachi; Masamitsu Ishida; Nobuyoshi Nakajima, all of Kanagawa, Japan

[73] Assignee: Fuji Photo Film Co., Ltd., Kanagawa, Japan

[21] Appl. No.: 327,459

[22] Filed: Mar. 22, 1989

Related U.S. Application Data

[63] Continuation of Ser. No. 821,927, Jan. 24, 1986, and a continuation of Ser. No. 279,223, Nov. 28, 1988, which is a continuation of Ser. No. 77,344, Jul. 24, 1987, abandoned.

[30] Foreign Application Priority Data

Jan. 25, 1985 [JP] Japan .................................. 60-11882
Jan. 25, 1985 [JP] Japan .................................. 60-11883
Jul. 24, 1986 [JP] Japan ................................. 61-174023
Jul. 24, 1986 [JP] Japan ................................. 61-174024

[51] Int. Cl.$^5$ .......................................... G01N 23/04
[52] U.S. Cl. .............................. 250/327.2; 250/484.1; 382/18
[58] Field of Search ................ 250/327.2 C, 327.2 D, 250/327.2 G, 484.1 B; 382/51, 18; 358/284

[56] References Cited

U.S. PATENT DOCUMENTS 4,284,889 8/1981 Kato et al. .................. 250/327.2 X
4,310,886 1/1982 Kato et al. .................. 250/327.2 G
4,578,712 3/1980 Matsunawa .......................... 358/282

OTHER PUBLICATIONS

"A Statist Meth for Image Classif. . ." by Chung J. of Applied Photo Cing vol. 3#2, 1977 p. 74.

Primary Examiner—Janice A. Howell
Assistant Examiner—Richard Hanig
Attorney, Agent, or Firm—Sughrue, Mion, Zinn, Macpeak & Seas

[57] ABSTRACT

In a method of reading out a radiation image stored in a stimulable phosphor sheet, preliminary read-out for approximately detecting the image is conducted. A cumulative histogram of the image information is created, read-out conditions in the final read-out are corrected based on a characteristic value of the cumulative histogram, then the final read-out is conducted using the corrected conditions. Alternatively, a standard image information range is determined from the characteristic value, and the read-out conditions are adjusted so that the standard range corresponds to a predetermined electronic signal range. In addition, in the read-out method where gradation processing is performed for electronic image signals obtained by photoelectrically detecting the phosphor light emitted by the sheet, histogram of the image signals is created, and a desired image signal range is determined therefrom. A cummulative histogram then is created, the desired range is corrected based on a characteristic value of the cumulative histogram, and gradation processing conditions are adjusted so that the corrected desired signal range corresponds to a predetermined electronic signal range. Alternatively, a standard signal range is determined based on the characteristic value, and gradation processing conditions are adjusted so that the standard range corresponds to a predetermined electronic signal range.

23 Claims, 7 Drawing Sheets

F I G.1
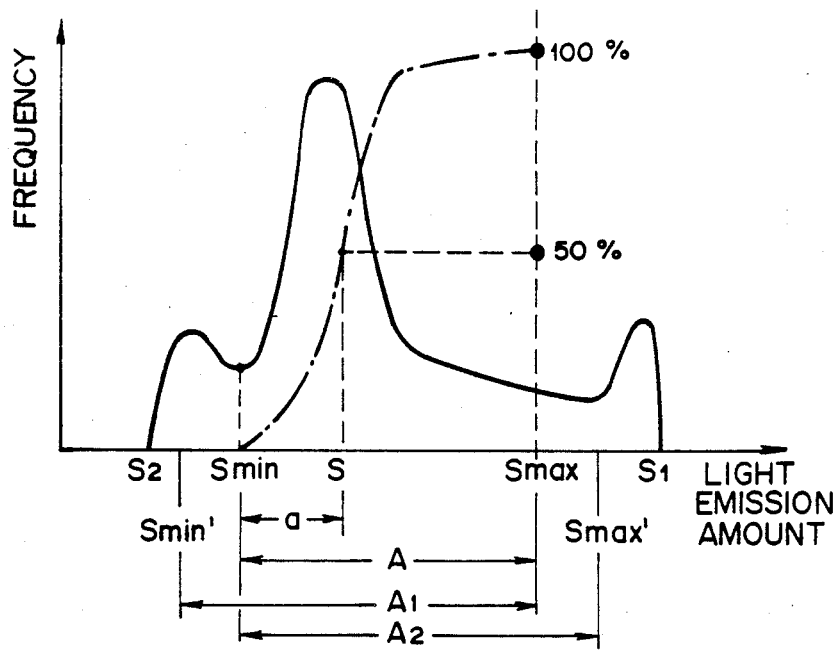
F I G.2
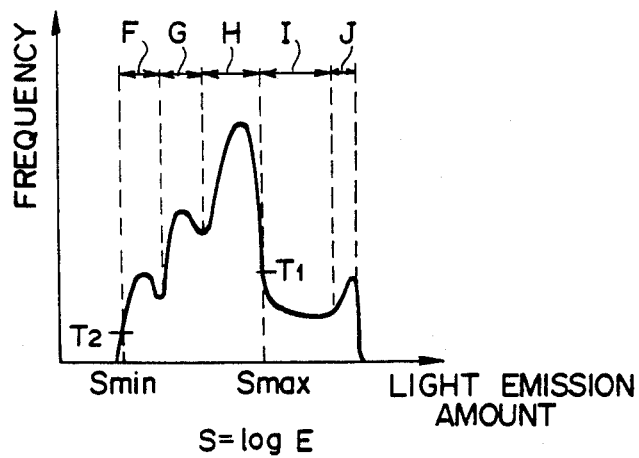

F I G. 5
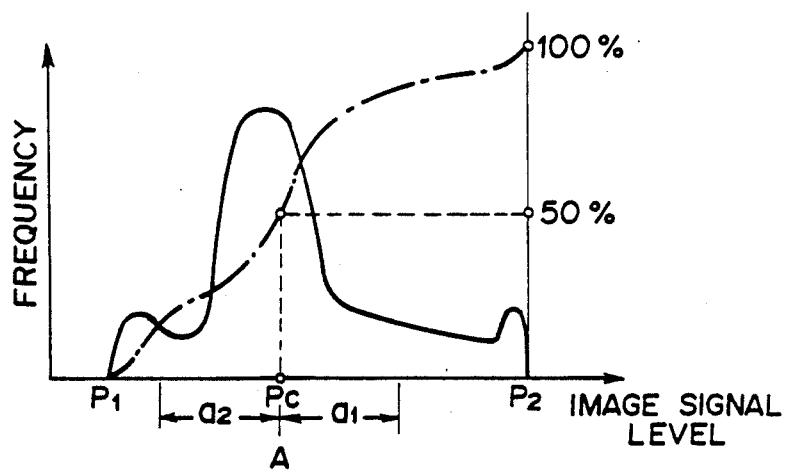
F I G. 6A
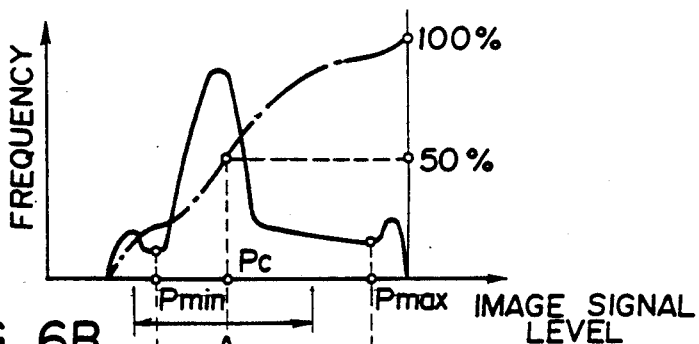
F I G. 6B
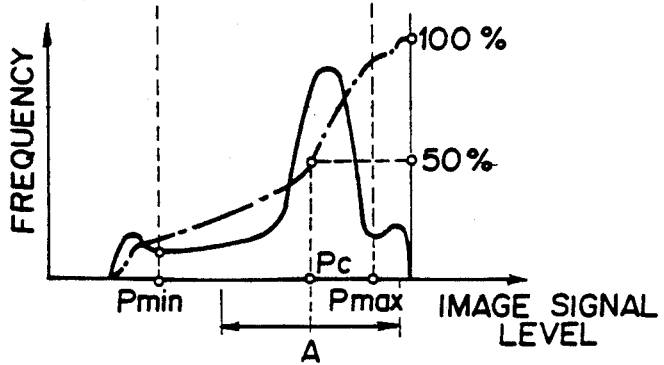

RADIATION IMAGE READ-OUT METHOD

This is a Continuation of Ser. No. 06/821,927 filed on Jan. 24, 1986 and Ser. No. 07/279,223 filed on Nov. 28, 1988, which is in turn a continuation of Ser. No. 07/077,344 filed July 24, 1987 now abandoned.

This invention relates to a method of reading out a radiation image and a method of processing the radiation image in a radiation image recording and reproducing system using a stimulable phosphor sheet for use in medical diagnosis or the like.

BACKGROUND OF THE INVENTION

When certain kinds of phosphors are exposed to a radiation such as X-rays, $\alpha$-rays, $\beta$-rays, $\gamma$-rays cathode rays, or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is exposed first to radiation passing through an object to have a radiation image stored therein, and then is scanned with stimulating rays such as a laser beam which cause the sheet to emit light in the pattern of the stored image. The emitted light is detected photoelectrically and converted to an electronic image signal, which is processed to produce a visible image on a recording medium such as a photographic film or on a display device such as a cathode ray tube (CRT).

In the aforesaid radiation image recording and reproducing system, image read-out should be performed by use of read-out conditions predetermined appropriately for each image recording.

The term "read-out conditions" as used herein refers to various conditions affecting the relationship between the amount of the light emitted by the sheet at the read-out step and the output of the read-out apparatus, for example, the read-out gain (sensitivity) determining the relationship between the input and the output of the read-out apparatus, and the scale factor (latitude).

When performing image processing, such as gradation processing, the gradation processing preferably should be performed by use of gradation processing conditions adjusted to appropriate values in accordance with each radiation image in order to improve the image quality, particularly the diagnostic efficiency and accuracy, of the visible image.

When image read-out is conducted by use of the read-out conditions predetermined appropriately for each image recording, it is possible to output the electronic image signal so that the necessary image information always is expressed within a (correct) density range suitable for viewing, particularly for diagnostic purposes, in the finally reproduced visible image regardless of any fluctuation in the level of the radiation energy stored in the phosphor sheet. Such fluctuations are caused by changes in the object, the image recording portion thereof, radiation doses or the like.

In addition, where gradation processing is performed using conditions adjusted to appropriate values in accordance with each radiation image stored on the sheet, it is possible to process the image so that the necessary image information always is expressed within the correct density range for viewing in every reproduced visible image regardless of any fluctuation in the level of the radiation energy stored on the sheet.

The read-out conditions may be adjusted in various ways. For example, the read-out conditions may be adjusted on the basis of the target portion of the object such as the head, chest or abdomen, and/or the recording method such as plain image recording, contrasted image recording, or enlargement image recording. Alternatively, preliminary read-out for approximately detecting the stored image information stored may be conducted using stimulating rays of a level lower than the level of stimulating rays used in final read-out. Preliminary read-out is conducted prior to final read-out, which final read-out refers to obtaining an electronic image signal for purposes of reproducing a visible image signal. Read-out conditions in the final read-out may be adjusted on the basis of the image information obtained by the preliminary read-out.

The latter method using the preliminary read-out is disclosed, for example, in Japanese Unexamined Patent Publication No. 58(1983)-67240. The electronic image signal detected by the final read-out conducted by use of the read-out conditions adjusted in this manner is, for example, sent to an image processing mechanism and is processed in accordance with the imaged (target) portion of the object and/or the recording method to obtain a visible image suitable for viewing, particularly for diagnostic purposes. The processed image signal is used to reproduce the visible image on a photographic film or the like.

As mentioned above, the level of the stimulating rays used in the preliminary read-out is lower than the level of the stimulating rays used in the final read-out. That is, the effective energy of the stimulating rays which the sheet receives per unit area in the preliminary read-out should be lower than the effective energy of the stimulating rays used in the final read-out. To make the level of the stimulating rays used in the preliminary read-out lower than the level of the rays in the final read-out, the output of the stimulating ray source (e.g., a laser beam source) may be decreased in the preliminary read-out, or the rays emitted by the source may be attenuated by an ND filter, an AOM, or the like, positioned in the optical path. Alternatively, the source for the preliminary read-out may be positioned independently of the source for the final read-out, and the output of the former may be made lower than the output of the latter. Also, the beam diameter of the rays may be increased, or the moving speed of the sheet may be increased in the preliminary read-out.

As the method of adjusting the read-out conditions in the final read-out on the basis of the image information obtained by the preliminary read-out, the applicant proposed in Japanese Patent Application No. 59(1984)-12658 a novel method including the steps of: determining a histogram of the preliminary read-out image information, calculating the maximum light emission amount Smax and the minimum light emission amount Smin of a desired image information range in the histogram, and adjusting the read-out conditions in final read-out so that the maximum light emission amount Smax and the minimum light emission amount Smin correspond, respectively, to the maximum signal level Qmax and the minimum signal level Qmin of a desired input signal range in the image processing mechanism. The signal levels are determined by the maximum density Dmax and the minimum density Dmin of a correct density range in the reproduced visible image.

Specifically, in this method, a histogram of the amount of the light emitted is obtained by preliminary read-out, and a desired image information range (range of the amount of the emitted light) is determined on the basis of the histogram. Since the pattern of the histogram is fixed approximately by the target portion of the subject and/or image recording conditions, the desired image information range is determined from the histogram with reference to the target portion and/or the recording conditions. For example, in the case of a chest image recording, the pattern of the histogram is as shown in FIG. 2, and it is possible to know that F in the histogram denotes the mediastinum, G denotes the heart, H denotes the lungs, I denotes the skin and the soft tissue, and J denotes a region outside of the object. Therefore, from the histogram, it is possible to calculate the maximum light emission from Smax and the minimum light emission amount Smin defining the desired image information range. For example, when information on the skin and the soft tissue (I) and information on the region outside of the object (J) are unnecessary in FIG. 2, the desired image information range becomes that from Smax to Smin including F, G, and H as shown. Smax and Smin may be calculated by various methods from the histogram, for example, by determining threshold values T1 and T2 in accordance with the desired information range, and calculating Smax and Smin on the basis of T1 and T2.

In the aforesaid recording and reproducing system, an electronic image signal is obtained from the light emitted by the sheet in proportion to the stored radiation energy by use of the read-out conditions with the final (photoelectric) read-out means, and is subjected to various signal processings in the image processing mechanism, particularly gradation processing which is conducted by use of gradation processing conditions determined in accordance with the image recording portion and/or image recording conditions. The processed signal is used to reproduce a visible image on a photographic film, or the like, by use of image reproduction means. The reproduced visible image should have a correct density range suitable for viewing, particularly for diagnostic purposes. In general, the correct density range (Dmax to Dmin) is determined in advance. Desired gradation processing condition also are determined in advance. Therefore, the range of signal levels (Qmax and Qmin) which should be sent to the image processing means as suitable for obtaining the correct density range (Dmax to Dmin) is determined by the gradation processing or image reproducing conditions. FIG. 3 shows the relationship between the amount of light emitted by the stimulable phosphor sheet and the density of the reproduced visible image.

Accordingly, the read-out conditions are adjusted so that the maximum light emission amount Smax and the minimum light emission amount Smin calculated as described above correspond to the maximum signal level Qmax and the minimum signal level Qmin determined as mentioned above.

However, in the method which involves determining the desired image information range (Smax to Smin) from the histogram of the preliminary read-out image information, and adjusting the read-out conditions so that the information range (Smax to Smin) corresponds to the correct density range (Dmax to Dmin), a problem, described below, arises. With reference to FIGS. 4A and 4B, there may arise a case in which the desired image information ranges (Smax to Smin) are the same though the distribution of the number of picture elements exhibiting the same light emission amount is markedly different. In this case, the information ranges (Smax to Smin) are output within the same correct density range (Dmax to Dmin). Therefore, in the case of FIG. 4A, there are many picture elements exhibiting a relatively low density, and the overall image becomes light. In the case of FIG. 4B, there are many picture elements exhibiting a relatively high density and the overall image becomes dark.

The aforesaid problem very adversely affects image observation particularly when a set of images are observed. For example, to view a set of images, a plurality of images of the same target portion of the same subject are recorded, and the corresponding reproduced visible images are placed side by side and observed together. In this case, since the target portion and the purpose of diagnosis are the same, the desired image information ranges (Smax to Smin) are the same, and this is true even if the frequency peak positions of the light emission amounts vary between the images. As a result density fluctuations arise between the reproduced visible images, and the diagnostic accuracy and efficiency are affected adversely. Examples of images of the same target portion of the same subject are as follows: the image of a barium-filled portion of the stomach, and a dual contrasted image of an air portion and a barium-filled portion of the stomach are recorded, or where stomach images are recorded by changing the position (standing, lying, etc.) of the subject (patient).

The aforesaid problem arises not only when the read-out conditions are adjusted based on the histogram of the preliminary read-out image information, but also when they are adjusted based on the target portion of the object and/or the recording method.

In the previously mentioned specific example of adjusting the gradation processing conditions, a proposed method includes the steps of: determining a histogram of the image signals detected photoelectrically, calculating the maximum image signal level Pmax and the minimum image signal level Pmin of a desired image signal range in the histogram, and adjusting the gradation processing conditions so that the maximum level Pmax and the minimum level Pmin correspond respectively to the maximum signal level Qmax and the minimum signal level Qmin of a desired input signal range to an image reproduction mechanism, and in which signal levels are determined by the maximum density Dmax and the minimum density Dmin of a correct density range in the reproduced visible image.

The aforesaid method will be described in detail with reference to FIG. 8. In FIG. 8, instead of a histogram of electronic image signals obtained by photoelectrically detecting light emitted by the phosphor sheet, a histogram of light emission amounts of the phosphor sheet prior to photoelectric detection thereof is shown. The light emission amounts are converted into electronic image signals by use of fixed and linear read-out conditions (i.e., the conditions determining the relationship between the light emission amount as the input to the photoelectric read-out means and the level of the electronic image signal as the output of the photoelectric read out means) as shown in FIG. 8. Therefore, the light emission amount and the image signal level have a proportional relationship to each other with a fixed constant of proportionality, and the histogram of the light emission amounts is substantially equivalent to the histogram of the image signals. Accordingly, in the following descriptions, the histogram of the light emission amounts as shown in FIG. 8 is regarded as the histogram of the image signals.

Specifically, in this method, as in the preliminary and final read-out method discussed above, a histogram of the image signals detected photoelectrically is created, and a desired image signal range (range of the amount of the emitted light) is determined from the histogram. Since the pattern of the histogram is fixed roughly by the target portion of the object and/or the recording method, the desired image signal range is determined from the histogram with reference to the target portion and/or the recording method. In the case of chest image recording as mentioned above, letters F, G, H, I, and J respectively denote the mediastinum, the heart, the lungs, the skin and soft tissue, and the region outside of the subject. Therefore, from the histogram, it is possible to calculate the maximum image signal level Pmax (i.e., the maximum light emission from Smax) and the minimum image signal level Pmin (i.e., the minimum light emission amount Smin) defining the desired image signal range. For example, in the case where information on the skin and the soft tissue I and information on the region outside of the object J are unnecessary, the desired image signal range is from Pmax to Pmin including F, G, and H as shown. Pmin and Pmax may be calculated from the histogram, for example, by determining threshold values T1 and T2 in accordance with the desired image signal range, and calculating Pmax and Pmin on the basis of T1 and T2 as explained above with respect to Smax and Smin.

As described previously, image signals obtained from the light emitted by the sheet are processed (here gradation processing), and are used to reproduce a visible image with a correct density range for viewing, particularly for diagnostic purposes. In general, the correct density range (Dmax to Dmin) is determined in advance. Also, image reproducing conditions in the image reproduction mechanism (i.e., the conditions determining the relationship between the input to the image reproduction mechanism and the output therefrom) are determined in advance.

Therefore, the range of signal levels (Qmax to Qmin) which should be sent to the image reproduction means, and which are suitable for obtaining the correct density range (Dmax to Dmin,) is determined by the image reproducing conditions.

Similarly, the conditions in the gradation processing are adjusted so that Pmax and Pmin calculated as explained above correspond to Qmax and Qmin determined as explained above.

This image processing method involving determining the desired image signal range (Pmax to Pmin) from the histogram of the image signals, adjusting the gradation processing conditions so that the desired image signal range (Pmax to Pmin) corresponds to the correct density range (Dmax to Dmin), and carrying out gradation processing using the conditions adjusted in this manner is advantageous in that the desired image signal range always can be expressed fully over the correct density range. However, this method suffers from the same drawback described previously. That is, as shown in FIG. 9A and 9B, the desired image signal ranges (Pmax to Pmin) may be the same though the distribution of the number of picture elements exhibiting the same image signal level is markedly different. In this case, the desired image signal ranges (Pmax to Pmin) are output within the same correct density ranges (Dmax to Dmin). Therefore, in the case of FIG. 9A, there are many picture elements exhibiting a relatively low density, and the overall image becomes light. In the case of FIG. 9B, there are many picture elements exhibiting a relatively high density, and the overall image becomes dark.

The aforesaid problem very adversely affects image observation, particularly in the case of recording a set of images, in which the desired image signal ranges (Pmax to Pmin) are the same though the frequency peak positions of the image signal levels are different between the images. As a result, density fluctuation arises between the reproduced visible images, and the diagnostic accuracy and efficiency are affected adversely.

This method involving determining the desired image signal range (Pmax to Pmin) from the histogram, and adjusting the gradation processing conditions so that the desired image signal range (Pmax to Pmin) corresponds to the correct density range (Dmax to Dmin) has another drawback as described below.

There may arise a case in which the minimum image signal level, or a value near the minimum image signal, level in the histogram of the image signals is used as the minimum image signal level Pmin of the aforesaid desired image signal range, and the target portion is the subject's upper arm, The upper arm may be an ordinary one, or may contain a foreign substance such as a metal member for reinforcement of a fractured bone, or a ceramic or metal artificial bone, which substance is less permeable to radiation than the upper arm. When the upper arm contains no foreign substance, the histogram is as shown in FIG. 10A, and when the upper arm contains a foreign substance, the histogram is as shown in FIG. 10B. since the foreign substance image portion K has a signal level lower than that of the upper arm image portion L. Specifically, although the Pmax value in this case is the same as where the upper arm contains no foreign substance, Pmin in this case deviates more toward the lower level side than Pmin in the case without any foreign substance. Therefore, if the desired image signal ranges (Pmax to Pmin) as calculated are used directly, and the gradation processing conditions are adjusted so that the desired image signal ranges (Pmax to Pmin) correspond to the same correct density range (Dmax to Dmin), the density of the upper arm image portion becomes higher, and the contrast thereof becomes lower in the visible image obtained where the upper arm contains a foreign substance than in the visible image obtained where the upper arm contains no foreign substance.

SUMMARY OF THE INVENTION

The primary object of the present invention is to provide a method of reading out a radiation image by adjusting in advance the read-out conditions based on a histogram of preliminary read-out image information, a target portion of an object, the recording method, or the like, and conducting final read-out by use of the adjusted read-out conditions, wherein density fluctuation between reproduced visible images is eliminated.

Another object of the present invention is to provide a radiation image read-out method for obtaining uniform visible images suitable for viewing, particularly for diagnostic purposes, in set image observation or the like.

A further object of the present invention is to provide a method of processing radiation images, which eliminates any variation in image density among reproduced visible images, particularly variations in image density in the case of set image observation, and variations in image density between the cases where an image recording portion of an object contains a foreign substance and where it contains no foreign substance.

An additional object of the present invention is to provide a method of processing a radiation image suitable for obtaining reproduced visible images having an improved image quality, particularly a high diagnostic efficiency and accuracy.

The present invention provides a radiation image read-out method including final read-out conducted by scanning a stimulable phosphor sheet carrying a radiation image stored therein with stimulating rays which cause the sheet to emit light in proportion to the stored radiation energy, photoelectrically detecting the emitted light by use of predetermined read-out conditions, and obtaining an electronic image signal for reproducing a visible image, wherein the improvement includes the steps of:

(i) prior to final read-out, conducting preliminary read-out for detecting the image stored in the sheet using stimulating rays of a level lower than the level of those used in final read-out;

(ii) creating a cumulative histogram of image information obtained by the preliminary read-out;

(iii) correcting predetermined read-out conditions in accordance with a characteristic value of the cumulative histogram; and (iv) conducting final read-out using the corrected read-out conditions.

In the read-out method of the present invention, read-out conditions predetermined on the basis of the target portion of the object, the image recording method, and/or the histogram of preliminary read-out image information are corrected based on a characteristic value of the cumulative histogram of the preliminary read-out image information, and the final read-out is performed using the corrected read-out conditions.

The characteristic value of the cumulative histogram of the preliminary read-out image information constitutes a reference value for judging whether the number of picture elements exhibiting a high density is larger or smaller than the number of picture elements exhibiting a low density in the radiation image stored in the sheet. In the inventive read-out method, since the read-out conditions are corrected based on this characteristic value, it is possible to obtain uniform visible images free of density fluctuation regardless of variations in density distribution between radiation images stored in different phosphor sheets, and thus to improve the image quality, particularly the diagnostic efficiency and accuracy, in set image observation or the like.

"Cumulative histogram" refers to the cumulative frequency distribution. The cumulative histogram of the preliminary read-out image information may be of the whole preliminary read-out image information or a part thereof, for example, within the desired image information range (Smax to Smin) determined in advance.

The predetermined read-out conditions may be corrected directly based on the characteristic value, or may be corrected based on a processed value obtained by processing the characteristic value.

The present invention also provides a radiation image read-out method including final read-out conducted by scanning a sheet carrying a radiation image to obtain an electronic image signal for reproducing a visible image, as above, wherein the improvement includes the steps of:

(i) prior to final read-out, conducting preliminary read-out for detecting the radiation image stored in the sheet by use of stimulating rays of a level lower than the level of those used in final read-out, (ii) creating a cumulative histogram of image information obtained by said preliminary read-out, (iii) determining a standard image information range on the basis of a characteristic value of the cumulative histogram, (iv) adjusting the read-out conditions so that the standard image information range corresponds to a predetermined electronic image signal range, and (v) conducting the final read-out using the adjusted read-out conditions.

In the last-mentioned read-out method of the present invention, when the standard image information range is determined appropriately based on an appropriate characteristic value of the cumulative histogram, the standard range is determined in accordance with the offset condition of the picture element density distribution of each image. Therefore, the read-out conditions adjusted based on the standard range are adjusted in accordance with the offset condition of the picture element density distribution. Since the final read-out is conducted using the read-out conditions adjusted in accordance with the offset condition of the picture element density distribution, it is possible to eliminate density fluctuation between reproduced visible images, particularly in set image observation, and to improve the image quality, particularly the diagnostic efficiency and accuracy.

The present invention is also a method of processing a radiation image obtained by photoelectrically detecting light emitted from a phosphor sheet to obtain electronic image signals for use in reproduction of a visible image, and gradation processing is performed on the electronic image signals, wherein the improvement includes the steps of:

(i) creating a histogram of the image signals, (ii) determining a desired image signal range on the basis of the histogram, (iii) creating a cumulative histogram of the image signals, (iv) correcting the desired image signal range in accordance with a characteristic value of the cumulative histogram, (v) adjusting gradation processing conditions so that the corrected desired image signal range corresponds to a predetermined electronic image signal range, and (vi) performing said gradation processing using the gradation processing conditions, In this inventive method, the desired image signal range determined on the basis of the photoelectrically detected image signals is corrected in accordance with the characteristic value of the cumulative histogram of the image signals. Gradation processing conditions are adjusted in accordance with the corrected desired image signal range, and gradation processing is performed by use of these conditions.

Specifically, as in a previous embodiment of the invention, the characteristic value of the cumulative histogram of the image signals constitutes a reference value for judging whether the number of picture elements exhibiting a high density is larger or smaller than the number of picture elements exhibiting a low density in the radiation image stored on the phosphor sheet. By using the characteristic value in adjusting the gradation processing conditions, it is possible to obtain uniform visible images free from density fluctuation regardless of variations in density distribution between radiation images stored on different sheets, and to improve the image quality, particularly the diagnostic efficiency and accuracy, in the case of set image observation or the like and in the case of image recording of an object containing a foreign substance.

The cumulative histogram of the image signals may be of all image signals or a part thereof, for example, those within a desired image signal range determined in advance.

The desired image signal range is corrected in accordance with the characteristic value of the cumulative histogram. i.e., by utilizing the characteristic value as a reference value. The desired image signal range may be corrected directly based on the characteristic value, or may be corrected based on a processed value obtained by processing the characteristic value.

The present invention is also a method of processing a radiation image in which a sheet carrying a radiation image stored thereon is scanned by stimulating rays, and electronic image signals are obtained as explained previously for reproducing a visible image, and gradation processing is performed on the electronic image signal, wherein the improvement includes the steps of:

(i) creating a cumulative histogram of the image signals, (ii) determining a standard image signal range on the basis of a characteristic value of the histogram, (iii) adjusting gradation processing conditions so that the standard image signal range corresponds to a predetermined electronic image signal range, and (iv) performing the gradation processing using the gradation processing conditions.

In this last-mentioned method, the cumulative histogram of the image signals is created, and the standard image signal range is determined on the basis of the characteristic value of the histogram. Gradation processing is performed by use of the gradation processing conditions adjusted on the basis of the standard range. When the standard range is determined based on an appropriate characteristic value of the cumulative histogram, the standard range is determined in accordance with the offset condition of the picture elements density distribution of each image. Therefore, the gradation processing conditions adjusted based on the standard range are thus adjusted in accordance with the offset condition of the picture element density distribution. With this method, it is possible to eliminate density fluctuation between reproduced visible images, particularly in set image observation, and to improve the image quality, particularly the diagnostic efficiency and accuracy.

BRIEF DESCRIPTION OF THE DRAWINGS

FIG. 1 is a graph showing the histogram and the cumulative histogram of a preliminary read-out image information for explanation of an embodiment of the radiation image read-out in accordance with the present invention, FIG. 2 is a graph showing the step of determining a desired image information range from the histogram of preliminary read-out image information, FIG. 5 is a graph showing the histogram and the cumulative histogram of preliminary read-out image information for explanation of another embodiment of the radiation image read-out method in accordance with the present invention, FIGS. 6A and 6B are graphs showing the case where the same desired image information ranges are obtained even though the histograms of the preliminary read-out image information are different.

DETAILED DESCRIPTION OF THE PREFERRED EMBODIMENTS

Figure 3:
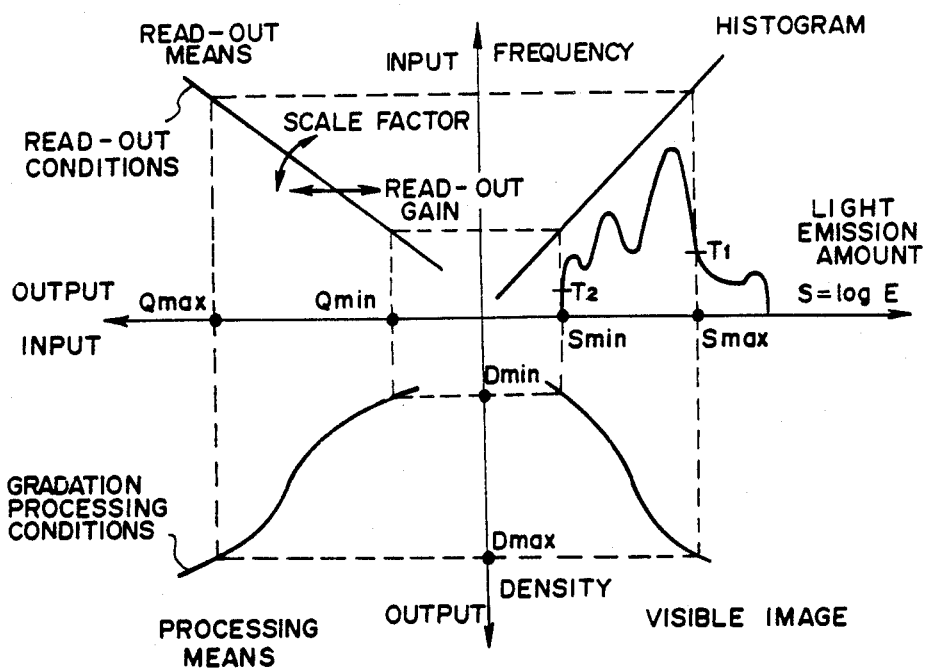
FIG. 3 is a graph showing the step of adjusting the read-out conditions based on the desired image information range.

The present invention will hereinbelow be described in further detail with reference to the accompanying drawings.

In the embodiment described below, a preliminary read-out is conducted prior to the final read-out, and a histogram of the obtained preliminary read-out image information is created. Read-out conditions for conducting final read-out are adjusted based on the histogram, then corrected on the basis of a characteristic value of the cumulative histogram of the preliminary read-out image information.

Specifically, the preliminary read-out is conducted first on a stimulable phosphor sheet carrying a radiation image stored therein. Then the histogram of the image information, i.e., light emission amounts at respective picture elements, obtained by the preliminary read-out is created, and the read-out conditions are adjusted based on the histogram. Adjustment of the read-out conditions based on the preliminary read-out and the histogram of the preliminary read-out image information may be conducted in the same manner as described above.

The histogram created at the read-out conditions adjusting step and the desired image information range (Smax to Smin) determined on the basis of the histogram are shown in FIG. 1.

In the read-out method of the present invention, prior to the final read-out, the preliminary read-out for approximately detecting the radiation image stored in the sheet is conducted by use of stimulating rays of a level lower than the level of the stimulating rays used in the final read-out, and a cumulative histogram of the image information obtained by the preliminary read-out is created.

The preliminary read-out for creation of the cumulative histogram is equivalent to the preliminary read-out for adjusting the read-out conditions in advance. Therefore, in this embodiment, the preliminary read-out is not repeated, and the cumulative histogram of the preliminary read-out image information is created by utilizing the image information obtained by the preliminary read-out conducted for adjusting the read-out conditions.

The cumulative histogram may be created over the whole range (S1 to S2) of the preliminary read-out image information. However, in this embodiment, as indicated by the chain line in FIG. 1, the cumulative histogram is created only for the desired image information range (Smax to Smin) determined when the read-out conditions are adjusted in advance.

After the cumulative histogram is created in this manner, a characteristic value Sc of the cumulative histogram is determined, and the read-out conditions adjusted in advance are corrected based on the characteristic value Sc.

In this embodiment, the 50% value (preliminary read-out information value at which the cumulative frequency is 50%) is selected as the characteristic value Sc, and the ratio a/A of the image information range a (a=Sc to Smin) to the desired image information range A (A=Smax to Smin) is calculated. When the ratio a/A is smaller than a first threshold value Th1, the minimum image information value Smin of the desired image information range is corrected to a smaller information value Smin' (Smin'<Smin). i.e., the lower end of the desired image information range is shifted by a predetermined amount towards the smaller light emission amount region. When the ratio a/A is larger than the second threshold value Th2, the maximum image information value Smax of the desired image information range is corrected to a larger information value Smax' (Smax'>Smax). i.e., the upper end of the desired image information range is shifted by a predetermined amount towards the larger light emission amount region. The read-out conditions are corrected so that the desired image information range A1 or A2 (A1=Smax to Smin', A2=Smax' to Smin) corrected in this manner corresponds to the correct density range (Dmax to Dmin) in a reproduced visible image.

The first and second threshold values Th1 and Th2 may be selected in accordance with the target portion of the object and/or the recording method. In general, Th1 and Th2 preferably should be approximately ⅓ and ⅔, respectively. The shift amount of the upper end or lower end of the desired image information range may be determined based on the target portion of the object and/or the recording method or by also considering the ratio of a/A to Th1 or Th2.

When a/A takes a value between Th1 and Th2, correction of the desired image information range is not conducted, and therefore correction of the read-out conditions is not performed.

By correcting the read-out conditions in the aforesaid manner, it is possible to eliminate density fluctuation between reproduced visible images, and to make the image density uniform.

Figure 4A:
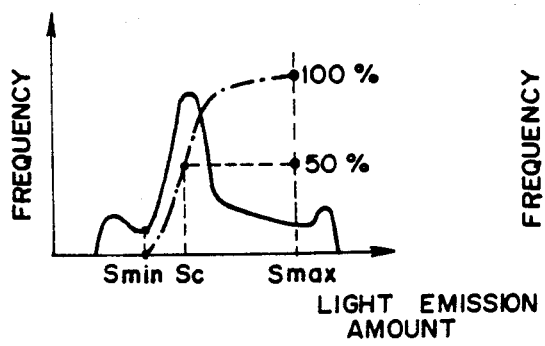
FIGS. 4A and 4B are graphs showing the case where the same desired image information ranges are obtained even though the histograms of the preliminary read-out image information are different.
Figure 4B:
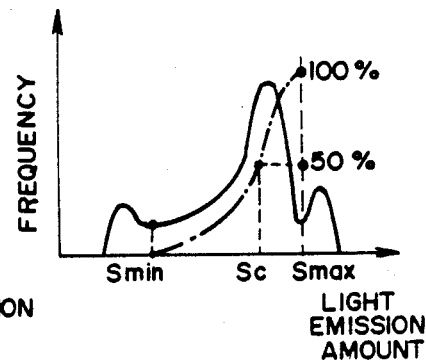

This is because, when the characteristic value of the cumulative histogram, for example, the 50% value Sc, is detected, and the position of the characteristic value Sc in the desired image information range (Smax to Smin) is investigated, it is possible to know whether the number of picture elements exhibiting a low density (a small light emission amount) is larger or smaller than the number of picture elements exhibiting a high density (a large light emission amount) within the desired image information range. For example, as shown in FIGS. 4A and 4B, the 50% characteristic value Sc becomes closer to Smin when the number of low-density picture elements is larger than the number of high-density picture elements, and becomes closer to Smax when the number of high-density picture elements is larger than the number of low-density picture elements.

Accordingly, an appropriate characteristic value is selected from the cumulative histogram, and used to detect whether the number of high-density picture elements is larger than the number of low-density picture elements (or vice versa) in the desired image information range used when the read-out conditions are adjusted in advance. When the number of low-density elements is larger than the number of high-density elements, the lower end of the desired range is shifted by a predetermined amount towards the low-density region, and the read-out conditions are corrected on the basis of this shifted range, thereby shifting the original desired image information range as a whole towards the high-density region. When the number of low-density elements is lower than the number of high-density elements, the upper end of the desired image information range is shifted by a predetermined amount towards the high-density region, and the read-out conditions are corrected on the basis of the desired image information range thus corrected, thereby shifting the original desired image information range as a whole towards the low-density region.

The characteristic value may be different from the 50% value, and the read-out conditions may be corrected based on two characteristic values.

The method in accordance with the present invention is applicable also to the case where the desired image information range is determined based on the target portion of the object and/or the recording conditions, and the read-out conditions adjusted on the basis of the desired range thus determined are corrected.

In the aforesaid embodiment, the cumulative histogram of the preliminary read-out image information within the desired range is created. This is because the level of density which is desired is that which is appropriate for the image information in the desired range which is reproduced in the visible image. For example when the characteristic value is selected to be 50%, the 50% value of the cumulative histogram in the desired image information range is not normally so much different from the 50% value of the desired range of the image information of the whole image information range, and there is a correlation between the two 50% values. Therefore, it is also possible to create the cumulative histogram of the whole range of the preliminary read-out image information, and to correct the read-out conditions based on the characteristic value of the created cumulative histogram.

Another embodiment of the radiation image read-out method in accordance with the present invention will be described with reference to FIG. 5.

In this embodiment, the preliminary read-out is conducted first on the sheet carrying a radiation image stored therein, and then a cumulative histogram of the preliminary read-out image information is created. FIG. 5 shows the histogram (solid line) and the cumulative histogram (chain line) of the preliminary read-out image information. The cumulative histogram is created over the whole range (S1 to S2) of the preliminary read-out image information. However the cumulative histogram may be created only over the preliminary read-out image information within a partial range predetermined based on the target portion of the object and/or the recording method.

Thereafter, the characteristic value Sc of the cumulative histogram of the preliminary read-out image information is selected, and a standard image information range is determined based on the characteristic value Sc.

In this embodiment, the 50% value is selected as the characteristic value Sc, and predetermined ranges a1 and a2 are taken from the characteristic value Sc towards the larger and smaller light emission amount sides, respectively shown in FIG. 5. The range A (A=Sc−a2 to Sc+a1) is the standard image information range.

The characteristic value Sc and the predetermined ranges a1, a2 may be selected in any manner, for example, on the basis of the target portion and/or the recording method. Of course, a1 may be equal to a2.

The standard range A may be determined based on Sc in various other manners, for example, by selecting two characteristic values Sc, Sc and determining the range between the two characteristic values Sc, Sc as the standard range.

After the standard range A is determined as described above, the read-out conditions are adjusted so that this range A corresponds to a predetermined electronic image signal range.

The electronic image signal range may be determined in any manner based on the target portion of the object, the image recording method the viewing purpose, and various other conditions. In this embodiment the input signal level range (Qmax to Qmin) which is input to the image processing means, which range corresponds to the correct density range (Dmax to Dmin) in the reproduced visible image, is selected as the electronic image signal range. The read-out conditions are adjusted so that the standard range A corresponds to the predetermined electronic image signal range (Qmin to Qmax), so that the light emission amount Sc−a2 is output as the electronic image signal Qmin from the photoelectric read-out mean, and the light emission amount Sc+a1 is outputted as the electronic image signal Qmax.

After the read-out conditions are adjusted in this manner, the final read-out is conducted by use of the adjusted read-out conditions, and electronic image signals for reproducing a visible image are obtained.

By adjusting the read-out conditions as described above and conducting the final read-out by use of the adjusted read-out conditions, it is possible to eliminate density fluctuation between reproduced visible images, and to make the image density uniform.

This is because the 50% characteristic value of the cumulative histogram represents the center of the picture element density distribution and the value changes as the picture element density distribution changes as described above. Therefore when the standard image information range is determined based on the 50% characteristic value, it is determined in accordance with the offset condition of the density distribution. As a result, when the read-out conditions are adjusted based on the standard range, they become the ones adjusted on the basis of the offset condition of the picture element density distribution. This will be clear from FIGS. 6A and 6B. When the number of low-density picture elements are comparatively large in an image, the standard image information range is determined in a low-density region as shown in FIG. 6A. When the number of high-density picture elements is comparatively large in an image, the standard range is determined in a high-density region as shown in FIG. 6B.

According to a further embodiment of the invention, light emitted from a phosphor sheet is detected photoelectrically (e.g. using a photomultiplier) to obtain electronic image signals. A histogram of the obtained image signals (i.e., the image signal levels at respective read-out picture elements on the sheet) is created, and a desired image signal range is determined based on the histogram. The desired image signal range may be determined in the same manner as discussed in the first embodiment of the invention.

In the foregoing description with respect to determination of the desired image signal range based on the histogram of the image signals, the histogram of the image signals obtained by detecting the emitted light using linear read-out conditions, which is substantially equivalent to a histogram of the light emission amounts, is taken as an example. However, the histogram of the image signals used in accordance with the present invention may be a histogram having some correlation to the histogram of the light emission amounts, and may be a histogram of image signals detected by use of non-linear read-out conditions for example.

Figure 7:
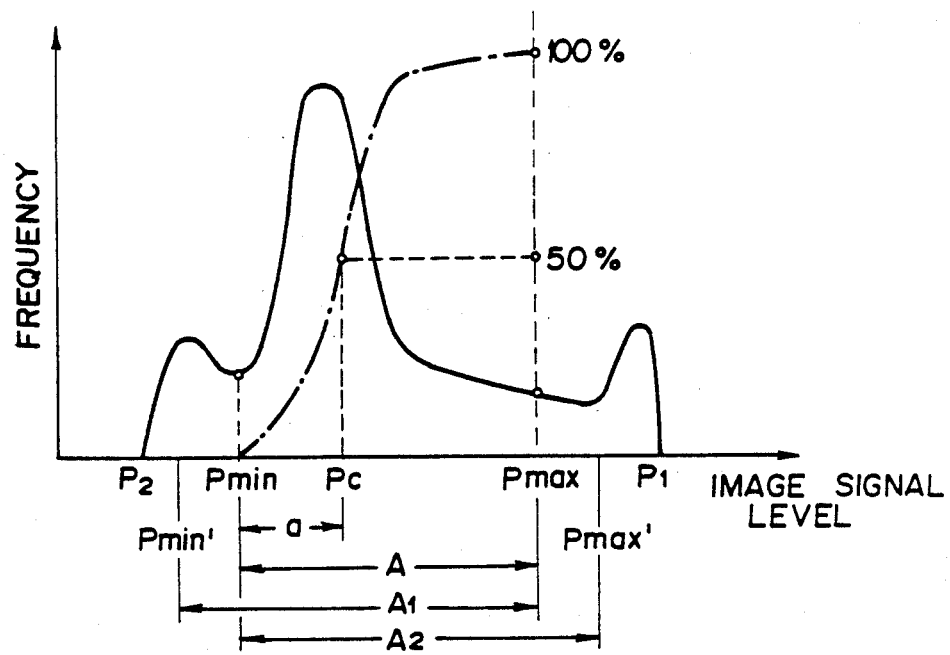
FIG. 7 is a graph showing a histogram and a cumulative histogram of image signals for explanation of an embodiment of the method of processing a radiation image in accordance with the present invention.

The histogram created in the course of determining the desired image signal range, and a desired image signal range A (Pmax to Pmin) determined on the basis of the histogram are shown in FIG. 7.

Then, a cumulative histogram of the image signals is created. The cumulative histogram may be created over the whole image signal range (P1 to P2) However, in this embodiment as indicated by the chain line in FIG. 7, the cumulative histogram is created only for the desired range A (Pmax to Pmin) which has already been determined.

After the cumulative histogram is created in this manner, a characteristic value Pc of the cumulative histogram is determined, and the desired range A (Pmax to Pmin), determined as mentioned above, is corrected in accordance with the characteristic value Pc.

In this embodiment, the 50% value (i.e., the image signal level at which the cumulative frequency is 50%) is selected as the characteristic value Pc, and the ratio a/A of the image signal range a (where a=Pc to Pmin) to the desired image signal range A (where A=Pmax to Pmin) is calculated. When the ratio a/A is smaller than a first threshold value Th1, the minimum image signal level Pmin of the desired image signal range is corrected to a lower signal level Pmin (where Pmin'<Pmin), i.e., the lower end of the desired range is shifted by a predetermined amount towards the lower side (i.e., towards the lower signal level region). When the ratio a/A is larger than a second threshold value Th2, the maximum image signal level Pmax of the desired image signal range is corrected to a higher signal level Pmax' (where Pmax'>Pmax) i.e., the upper end of the desired image signal range is shifted by a predetermined amount towards the upper side (i.e., towards the higher signal level region).

The first threshold value Th1 and the second threshold value Th2 may be selected in accordance with the target portion and/or the recording method. In general, Th1 and Th2 preferably should be approximately $\frac{1}{3}$ and $\frac{2}{3}$, respectively. The shift amount of the lower end or the upper end of the desired image signal range may be determined based on the target portion and/or the recording method, or by also considering the ratio of a/A to Th1 or Th2. By way of example, the shift amounts of the upper end and the lower end of the desired range and consequently Pmin' and Pmax' may be determined to satisfy the formulas shown below.

$$\frac{Pc - Pmin'}{Pmax - Pmin'} = Th1, \text{ where } Pmin' < Pmin$$

$$\frac{Pc - Pmin}{Pmax' - Pmin} = Th2, \text{ where } Pmax' > Pmax$$

When a/A takes a value between Th1 and Th2, correction of the desired image signal range is not performed.

Then, gradation processing conditions are adjusted so that a corrected desired image signal range A1 (where A1=Pmax to Pmin') or a corrected desired image signal range A2 (where A2=Pmax' to Pmin) obtained by correction as mentioned above corresponds to a predetermined electronic image signal range.

The predetermined electronic image signal range may be determined appropriately based on the target portion, the recording method, the purpose of viewing, and/or various other recording conditions, for example, radiation energy, radiation doses, and, type of the stimulable phosphor sheet. In this embodiment the input signal level range (Qmax to Qmin) in the image reproduction means corresponding to the correct density range (Dmax to Dmin) in the reproduced visible image as mentioned above is determined as the predetermined electronic image signal range, and gradation processing conditions are adjusted so that the corrected desired image signal range A1 (where A1=Pmax to Pmin') or the corrected range A2 (where A2=Pmax' to Pmin) corresponds to the predetermined electronic image signal range (Qmax to Qmin).

Adjustment of the gradation processing conditions may be performed as described below.

Gradation processing is performed to convert the level of each image signal fed to an image processing means (a gradation processing means) by use of predetermined conditions. The predetermined conditions are referred to as the gradation processing conditions, which conditions usually are expressed by a non-linear gradation curve.

The purpose of gradation processing is to obtain visible reproduced image suitable for viewing, particularly for diagnostic purposes, in accordance with the image recording conditions, for example, the target portion and/or the recording method. Therefore, in general, basic patterns of non-linear gradation processing conditions most suitable for the respective image recording conditions should be determined preferably in advance, one of the basic patterns of the gradation processing conditions should be selected in accordance with the recording conditions of an image in the course of gradation processing of the image, and the gradation processing should be performed by use of the selected basic pattern.

Figure 8:
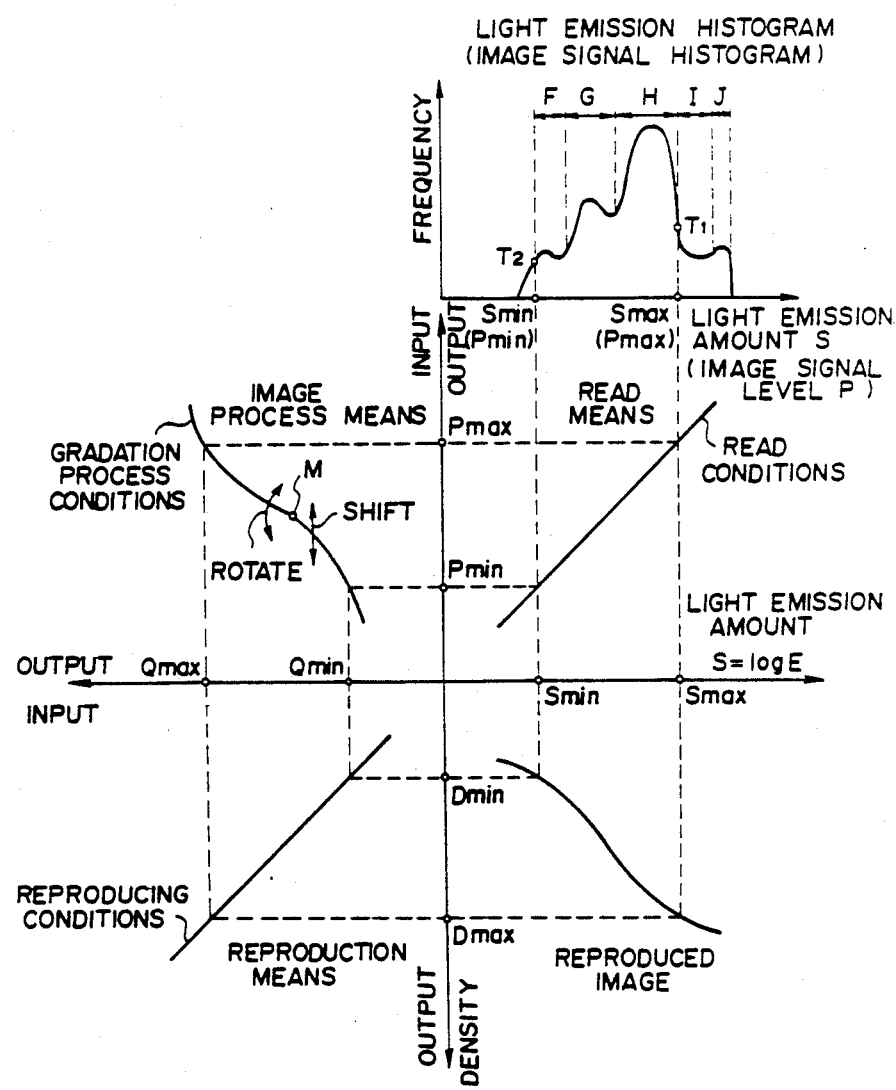
FIG. 8 is a graph showing the step of adjusting the gradation processing conditions on the basis of a desired image signal range.

Also in this embodiment, an appropriate basic pattern is selected from those of the gradation processing conditions predetermined in accordance with the image recording conditions. The gradation processing conditions are adjusted by, as shown in the second quadrant of FIG. 8, vertically shifting the selected basic pattern or rotating it around a predetermined center point M so that Pmax corresponds to Qmax or Pmin corresponds to Qmin.

Besides the non-linear gradation processing conditions determined by the image recording conditions as mentioned above, linear gradation processing conditions may be used in some cases. In such a case, the conditions which should be used are adjusted by rotating or shifting a single predetermined straight line in the manner as mentioned above so that Pmax corresponds to Qmax or Pmin corresponds to Qmin.

By adjusting the gradation processing conditions in the aforesaid manner, it is possible to eliminate density fluctuation between reproduced visible images and to make the image density uniform.

Figure 9A:
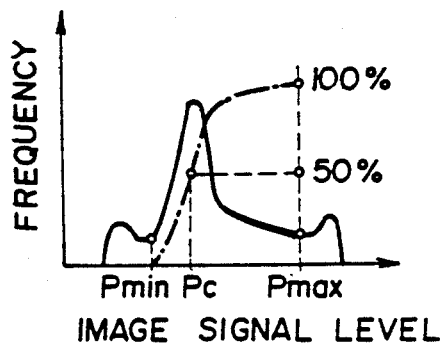
FIGS. 9A and 9B are graphs showing the cases where the same desired image signal ranges are obtained even though the histograms of the image signals are different.
Figure 9B:
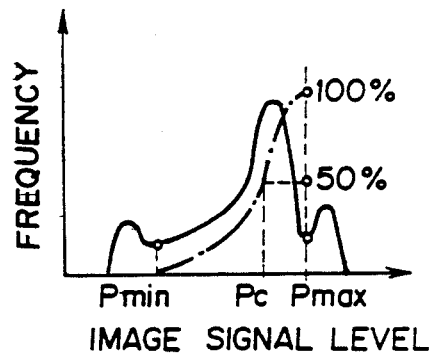

This is because, when the characteristic value of the cumulative histogram for example, the 50% value Pc is detected and the position of the characteristic value Pc in the desired image signal range (Pmax to Pmin) is investigated it is possible to know whether the number of picture elements exhibiting a low density (i.e., a low image signal level) is larger or smaller than the number of elements exhibiting a high density (i.e., a high image signal level) within the desired image signal range. For example, as shown in FIGS. 9A and 9B, the 50% characteristic value Pc is closer to Pmin when the number of low-density elements is larger than the number of high-density elements and is closer to Pmax when the number of high-density elements is larger than the number of low-density elements.

Accordingly, an appropriate characteristic value is selected from the cumulative histogram, and used to detect whether the number of high-density elements is larger than the number of low-density elements, or vice versa, in the desired image signal range which is determined based on the histogram of the image signals. When the number of low-density elements is larger than the number of high-density elements, the desired image signal range is corrected by shifting the lower end thereof by a predetermined amount towards the low-density region, and the gradation processing conditions are adjusted on the basis of the desired image signal range thus corrected, thereby shifting the original desired range as a whole towards the high-density region. When the number of high-density elements is larger than the number of low-density elements, the desired range determined based on the histogram of the image signals is corrected by shifting the upper end of the desired range by a predetermined amount towards the high-density region, and the gradation processing conditions are adjusted on the basis of the desired range thus corrected, thereby shifting the original desired range as a whole towards the low-density region.

It is possible for the characteristic value to be different from the 50% value, or for the desired image signal range to be corrected based on two characteristic values.

In the aforesaid embodiment, the cumulative histogram of the image signals within the desired image signal range is created. This is because the level of density at which the image signals in the desired range are reproduced in the visible image is concerned. For example when the 50% value is selected as the characteristic value, the 50% value of the cumulative histogram of the image signals in the desired range is normally not so much different from the 50% value of the cumulative histogram of the image signals of the overall image signal range, and there is a correlation between the two 50% values. Therefore, it is also possible to create the cumulative histogram of the overall range of the image signals, and to correct the desired image signal range based on the characteristic value of the created cumulative histogram.

Also in the aforesaid embodiment, when a/A i.e., (Pc−Pmin)/(Pmax−Pmin), is larger than the predetermined threshold value Th2, the maximum image signal level Pmax of the desired range is corrected to the higher signal level Pmax'. Where, the object contains a foreign substance not so permeable to radiation and a/A is larger than the predetermined threshold value the low image signal level region representing the foreign substance image portion can be cut off. Therefore, in this case instead of correcting Pmax to the higher signal level Pmax', Pmin may be corrected to a higher signal level Pmin'. Specifically, the lower end of the desired image signal range is shifted by a predetermined amount towards the higher signal level side, and the gradation processing conditions are adjusted so that the desired image signal range (Pmin' to Pmax) obtained by the shifting corresponds to the predetermined electronic image signal range (Qmax to Qmin). The level Pmin' in this case may be determined in various manners, e.g. by satisfying the formula shown below:

$$\frac{Pc - Pmin'}{Pmax - Pmin'} = Th2, \text{ where } Pmin' > Pmin$$

Figure 10A:
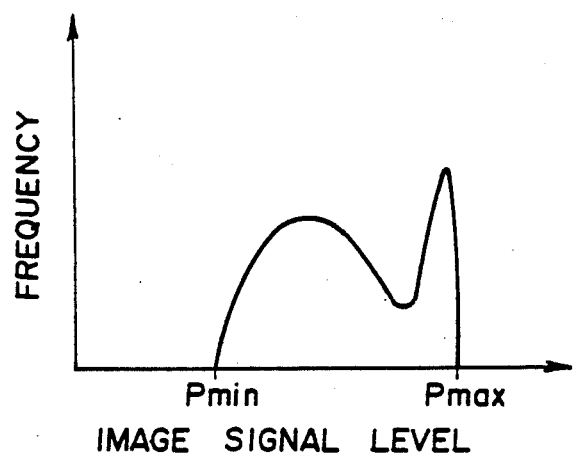
FIGS. 10A and 10B are graphs showing the histograms of the image signals in the case where the image recording portion of an object contains no foreign substance, and in the case where the image recording portion of the object contains a foreign substance, respectively
Figure 10B:
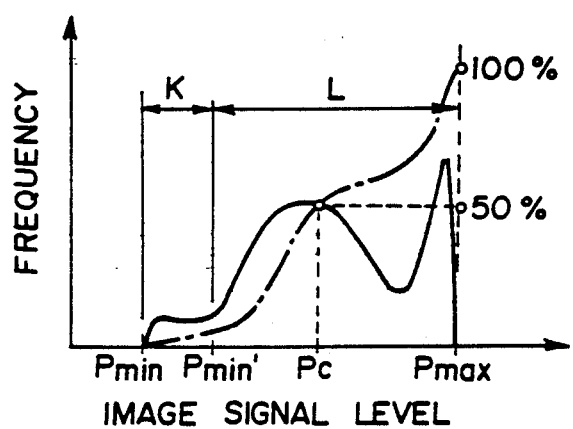

An example of Pmin' determined in this manner is shown in FIG. 10B. Also in this case, the characteristic value Pc and the threshold value Th2 may be determined by any appropriate methods.

Another embodiment of the method of processing a radiation image in accordance with the present invention will be described with reference to FIG. 11.

Figure 11:
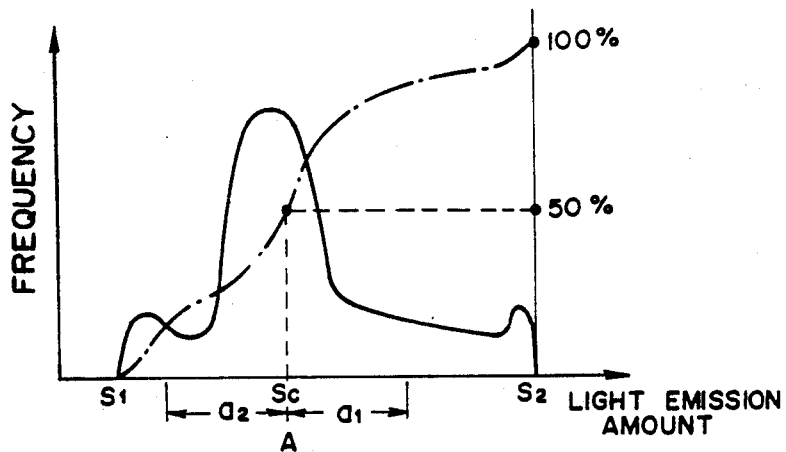
FIG. 11 is a graph shoWing the histogram and the cumulative histogram of image signals for explanation of another embodiment of the method of processing a radiation image in accordance with the present invention.

FIG. 11 shows the histogram (as indicated by the full line) and the cumulative histogram (as indicated by the chain line) of the image signals In this embodiment, the cumulative histogram is created over the overall range (P1 to P2) of the image signals. However, the cumulative histogram may be created only over the image signals within a partial range predetermined based on, for example the target portion and/or the image recording method.

Thereafter, the characteristic value Pc of the cumulative histogram of the image signals is selected, and a standard image signal range is determined based on the characteristic value Pc.

In this embodiment, the 50% value is selected as the characteristic value Pc, and predetermined ranges a1 and a2 are taken from the characteristic value Pc towards the higher image signal level side and the lower image signal level side as shown in FIG. 11. The range A (A=Pc−a2 to Pc+a1) is determined as the standard image signal range.

The characteristic value Pc and the predetermined ranges a1 and a2 may be selected in various appropriate manners, for example on the basis of the target portion and/or the recording method. Of course, a1 may be equal to a2.

The standard image signal range A may be determined based on the characteristic value Pc in various other manners, for example, by selecting two appropriate characteristic values Pc, Pc, and determining the range between the two values Pc, Pc as the standard image signal range.

After the standard range A is determined in the manner as mentioned above, the gradation processing conditions are adjusted so that the standard range A corresponds to a predetermined electronic image signal range.

The predetermined electronic image signal range may be selected in various manners based on the image recording portion of the object, the image recording method, the purpose of viewing, and various other conditions. In this embodiment, the input signal level range (Qmax to Qmin) to the image reproduction means, which corresponds to the correct density range (Dmax to Dmin) in the reproduced visible image is selected as the predetermined electronic image signal range. The gradation processing conditions are adjusted so that the standard image signal range A (where A=Pc−a2 to Pc+a1) corresponds to the predetermined electronic image signal range (Qmax to Qmin), i.e., so that the image signal level (Pc−a2) is output as Qmin and the image signal level (Pc+a1) is outputted as Qmax from the image processing means.

Adjustment of the gradation processing conditions may be performed in the manner as mentioned above with reference to the first embodiment.

By adjusting the gradation processing conditions in the aforesaid manner and performing the gradation processing by use of the adjusted conditions, it is possible to eliminate density fluctuation between reproduced visible images, and to make the image density uniform.

This is because the 50% characteristic value of the cumulative histogram represents the center of the picture element density distribution in the overall image, and changes as the picture element density distribution changes as mentioned above. Therefore, when the standard image signal range is determined based on the 50% characteristic value, it is determined in accordance with the offset condition of the picture element density distribution. As a result, when the gradation processing conditions are adjusted based on the standard image signal range, they become the ones adjusted on the basis of the offset condition of the picture element density distribution.

Figure 12A:
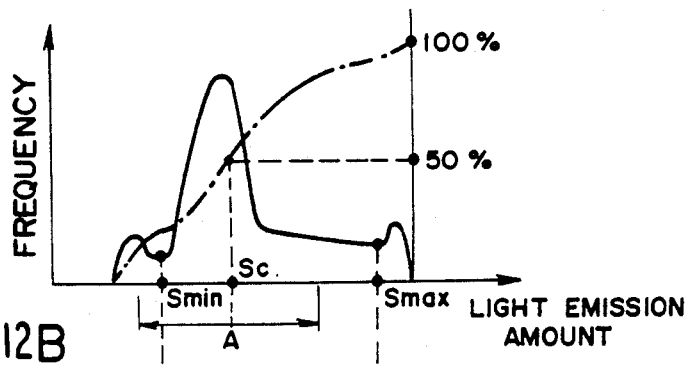
FIGS. 12A and 12B are graphs showing the case where the same desired image signal ranges are obtained even though the histograms of the image signals are different.
Figure 12B:
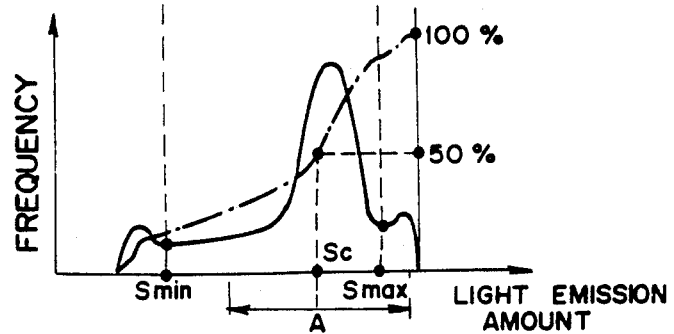

This will be clear from FIGS. 12A and 12B. When the number of low-density picture elements is comparatively large in an image, the standard image signal range is determined in a low-density region as shown in FIG. 12A. When the number of high-density picture elements is comparatively large in an image, the standard image signal range is determined in a high-density region as shown in FIG. 12B.

What is Claimed is:

1. A radiation image read-out method including final read-out conducted by scanning a stimulable phosphor sheet carrying a radiation image stored therein with stimulating rays which cause the stimulable phosphor sheet to emit light in proportion to the stored radiation energy, photoelectrically detecting the emitted light by use of predetermined read-out conditions, and obtaining an electronic image signal for reproducing a visible image, wherein the improvement comprises the steps of:
(i) prior to said final read-out, conducting preliminary read-out for detecting the radiation image stored in said stimulable phosphor sheet by use of stimulating rays of a level lower than the level of stimulating rays used in said final read-out;
(ii) predetermining a desired image information range having lower and upper boundaries as one of said predetermined read-out conditions,
(iii) creating a cumulative histogram image information obtained by said preliminary read-out,
(iv) selecting a characteristic value of said cumulative histogram which provides an indication of the frequency distribution of the light emission amounts from the scanned stimulable phosphor sheet;
(v) correcting said predetermined read-out conditions in accordance with the selected characteristic value of said cumulative histogram, including reducing said lower boundary of said desired image information range when said selected characteristic value is below a first threshold amount, and increasing said upper boundary of said desired image information range when said selected characteristic value is above a second threshold amount; and
(vi) conducting said final read-out by use of said corrected read-out conditions.

2. A method as defined in claim 1 wherein said cumulative histogram is created only for a desired image information range (maximum light emission amount Smax to minimum light emission amount Smin) which is determined based on the image information obtained by said preliminary read-out when said read-out conditions are predetermined.

3. A method as defined in claim 2 wherein a 50% image information value at which the cumulative frequency is 50% in said cumulative histogram is selected as said characteristic value.

4. A method as defined in claim 2 wherein a ratio of the image information range between said characteristic value and said lower boundary (which corresponds to minimum light emission amount Smin) to said desired image information range (Smax to Smin) is calculated, the lower end of said desired image information range (Smax to Smin) is shifted towards the small light emission amount region when said ratio is smaller than said first threshold value, the upper end of said desired image information range (Smax to Smin) is shifted towards the large light emission amount region when said ratio is larger than a second threshold value, and said predetermined read-out conditions are corrected so that the desired image information range obtained by said shifting corresponds to a correct density range (maximum density Dmax to minimum density Dmin) in said reproduced visible image.

5. A method as defined in claim 4 wherein said first threshold value is ⅛ and said second threshold value is ⅞.

6. A radiation image read-out method including final read-out conducted by scanning a stimulable phosphor sheet carrying a radiation image stored therein with stimulating rays which cause the stimulable phosphor sheet to emit light in proportion to the stored radiation energy, photoelectrically detecting the emitted light, and obtaining an electronic image signal for reproducing a visible image, said electronic image signal having a predetermined electronic image signal range, wherein the improvement comprises the steps of:
(i) prior to said final read-out, conducting preliminary read-out for detecting the radiation image stored in said stimulable phosphor sheet by use of stimulating rays of a level lower than the level of stimulating rays used in said final read-out;
(ii) predetermining read-out conditions for said final read-out;
(iii) creating a cumulative histogram of image information obtained by said preliminary read-out;
(iv) selecting a characteristic value of said cumulative histogram which provides an indication of the frequency distribution of the light emission amounts from the scanned stimulable phosphor sheet;
(v) correcting said predetermined read-out conditions in accordance with the selected characteristic value of said cumulative histogram, including determining a standard image information range based on said characteristic value, and adjusting said read-out conditions so that said standard image information range corresponds to said predetermined electronic image signal range; and
(vi) conducting said final read-out by use of said adjusted read-out conditions.

7. A method as defined in claim 6 wherein a 50% image information value at which the cumulative frequency is 50% in said cumulative histogram is selected as said characteristic value.

8. A method as defined in claim 6 wherein predetermined ranges are taken from said characteristic value respectively towards greater and smaller light emission amounts, and together said predetermined ranges form said standard image information range.

9. A method as defined in claim 6 wherein a desired input signal level range (maximum signal level Qmax to minimum signal level Qmin), for input to a means for processing said electronic image signals to produce said visible image, corresponds to a correct density range (maximum density Dmax to minimum density Dmin) in said visible image, and is selected as said predetermined electronic image signal range.

10. A method as defined in claim 7 wherein a desired input signal level range (maximum signal level Qmax to minimum signal level Qmin) in an image processing means, which corresponds to a correct density range (maximum density Dmax to minimum density Dmin) in said reproduced visible image, is selected as said predetermined electronic image signal range.

11. A method as defined in claim 8 wherein a desired input signal level range (maximum signal level Qmax to minimum signal level Qmin) in an image processing means, which corresponds to a correct density range (maximum density Dmax to minimum density Dmin) in said reproduced visible image, is selected as said predetermined electronic image signal range.

12. A method of processing a radiation image in which a stimulable phosphor sheet carrying a radiation image stored thereon is scanned by stimulating rays which cause the stimulable phosphor sheet to emit light in proportion to the stored radiation energy, the emitted light is detected photoelectrically to obtain electronic image signals and gradation processing is performed for the electronic image signals, a predetermined electronic image signal range of said image signals being used for reproducing a visible image, wherein the improvement comprises the steps of:
(i) creating a histogram of said image signals;
(ii) determining a desired image signal range on the basis of said histogram;
(iii) creating a cumulative histogram of said image signals;
(iv) correcting said desired image signal range in accordance with a characteristic value of said cumulative histogram;
(v) adjusting gradation processing conditions so that the corrected desired image signal range corresponds to said predetermined electronic image signal range; and
(vi) performing said gradation processing by use of said gradation processing conditions.

13. A method as defined in claim 12, wherein said cumulative histogram is created only for said desired image signal range determined on the basis of said histogram.

14. A method as defined in claim 13 wherein a 50% image signal level at which the cumulative frequency is 50% in said cumulative histogram is selected as said characteristic value.

15. A method as defined in claim 13 wherein said correction of said desired image signal range is performed by calculating a ratio of the image signal range between said characteristic value and a minimum image signal level of said desired image signal range to said desired image signal range, reducing the minimum level of said desired image signal when said ratio is smaller than a first threshold value, and increasing a maximum image signal level of said desired image signal range when said ratio is larger than a second threshold value.

16. A method as defined in claim 15 wherein said first threshold value is approximately $\frac{1}{3}$, and said second threshold value is approximately $\frac{2}{3}$.

17. A method as defined in claim 12 wherein an input signal level range, for input to a means for reproducing said visible image from the electronic image signals, corresponds to a correct density range in said visible image, and is selected as said predetermined electronic image signal range.

18. A method of processing a radiation image in which a stimulable phosphor sheet carrying a radiation image stored thereon is scanned by stimulating rays which cause the stimulable phosphor sheet to emit light in proportion to the stored radiation energy, the emitted light is detected photoelectrically to obtain electronic image signals, and gradation processing is performed for the electronic image signals, a predetermined electronic image signal range of said image signals being used for reproducing a visible image, wherein the improvement comprises the steps of:
(i) creating a cumulative histogram of said image signals;
(ii) determining a standard image signal range on the basis of a characteristic value of said cumulative histogram;
(iii) adjusting gradation processing conditions so that said standard image signal range corresponds to the predetermined electronic image signal range; and
(iv) performing said gradation processing by use of said gradation processing conditions.

19. A method as defined in claim 18 wherein a 50% image signal level at which the cumulative frequency is 50% in said cumulative histogram is selected as said characteristic value.

20. A method as defined in claim 18 wherein predetermined ranges are taken from said characteristic value respectively towards the high image signal level side and towards the low image signal level side, and the sum of said predetermined ranges is determined as said standard image signal range.

21. A method as defined in claim 18 wherein an input signal level range in an image reproduction means, which corresponds to a correct density range in said reproduced visible image, is selected as said predetermined electronic image signal range.

22. A method as defined in claim 6 wherein said read-out conditions are predetermined on the basis of said preliminary read-out.

23. A method as defined in claim 1 wherein said read-out conditions are predetermined on the basis of said preliminary read-out.

* * * * *